United States Patent
Blaz et al.

(10) Patent No.: US 11,296,577 B2
(45) Date of Patent: Apr. 5, 2022

(54) ELECTRIC DRIVE MOTOR

(71) Applicant: BSH HAUSGERAETE GMBH, Munich (DE)

(72) Inventors: Robert Blaz, Humenne (SK); Viliam Farkas, Michalovce (SK); Michal Kalavsky, Kosice (SK)

(73) Assignee: BSH Hausgeraete GmbH, Munich (DE)

( * ) Notice: Subject to any disclaimer, the term of this patent is extended or adjusted under 35 U.S.C. 154(b) by 253 days.

(21) Appl. No.: 16/604,256

(22) PCT Filed: Mar. 21, 2018

(86) PCT No.: PCT/EP2018/057108
§ 371 (c)(1),
(2) Date: Oct. 10, 2019

(87) PCT Pub. No.: WO2018/188916
PCT Pub. Date: Oct. 18, 2018

(65) Prior Publication Data
US 2020/0161933 A1  May 21, 2020

(30) Foreign Application Priority Data
Apr. 10, 2017 (DE) ............... 10 2017 206 092.1

(51) Int. Cl.
*H02K 7/04* (2006.01)
*H02K 1/27* (2006.01)
(Continued)

(52) U.S. Cl.
CPC ............. *H02K 7/04* (2013.01); *H02K 1/2773* (2013.01); *H02K 1/28* (2013.01); *H02K 1/32* (2013.01);
(Continued)

(58) Field of Classification Search
CPC .......... H02K 7/04; H02K 1/2773; H02K 1/28; H02K 1/32; H02K 15/03; H02K 15/12; H02K 15/165; H02K 21/16
See application file for complete search history.

(56) References Cited

U.S. PATENT DOCUMENTS 7,230,359 B2   6/2007 Iles-Klumpner
8,146,234 B2   4/2012 Marioni
(Continued)

FOREIGN PATENT DOCUMENTS

CN    1983774 A    6/2007
CN  102668330 A    9/2012
(Continued)

*Primary Examiner* — Tulsidas C Patel
*Assistant Examiner* — Riley Owen Stout
(74) *Attorney, Agent, or Firm* — Laurence A. Greenberg; Werner H. Stemer; Ralph E. Locher

(57) ABSTRACT

An electric drive motor includes a stator with pole shoes and at least one electrically controllable stator winding. A permanent magnet rotor is rotatably mounted in the field of the stator winding leaving an annular gap. The rotor includes a motor shaft and a laminated core on the shaft. The core includes at least a number of permanent magnets corresponding to the number of poles of the rotor. The magnets in the core are coated with a plastic envelope having at least one side wall covering the core on at least one axial front side. The side wall includes at least one recess freeing areas of the axial front side covered by the side wall, as access openings for boring the core to balance the rotor. A household appliance has the electric drive motor and an injection mold is used for producing the electric drive motor coated with the envelope.

13 Claims, 4 Drawing Sheets

(51) Int. Cl.
*H02K 1/28* (2006.01)
*H02K 1/32* (2006.01)
*H02K 15/03* (2006.01)
*H02K 15/12* (2006.01)
*H02K 15/16* (2006.01)
*H02K 21/16* (2006.01)
*H02K 1/276* (2022.01)

(52) U.S. Cl.
CPC ............. *H02K 15/03* (2013.01); *H02K 15/12* (2013.01); *H02K 15/165* (2013.01); *H02K 21/16* (2013.01)

(56) References Cited

U.S. PATENT DOCUMENTS

| | | | |
|---|---|---|---|
| 2012/0256500 A1 | 10/2012 | Mann et al. | |
| 2012/0313463 A1* | 12/2012 | Howell | H02K 15/03 310/43 |
| 2014/0102674 A1* | 4/2014 | Manz | H02K 1/274 165/121 |

FOREIGN PATENT DOCUMENTS

| | | |
|---|---|---|
| DE | 1563040 A1 | 4/1970 |
| EP | 2908407 A2 | 8/2015 |
| JP | 2002371962 A | 12/2002 |
| JP | 4464584 B2 | 5/2010 |
| WO | 03081748 A1 | 10/2003 |

* cited by examiner

ELECTRIC DRIVE MOTOR

BACKGROUND OF THE INVENTION

FIELD OF THE INVENTION

The invention relates to an electric drive motor, having a stator with pole shoes and at least one electrically controllable stator winding, and a permanent magnet rotor mounted in the field of the stator winding in a rotatably drivable manner leaving an annular gap, which has a motor shaft and a laminated core arranged on the motor shaft, which has at least a number of permanent magnets corresponding to the number of poles of the permanent magnet rotor. The invention also relates to a household appliance having such an electric drive motor and an injection mold for producing such an electric drive motor coated with a plastic envelope.

WO 03/081748 A1 describes a multiphase internal rotor motor with a grooved stator, a rotor separated from the stator by an air gap, which has a laminated core with a multiplicity of distinct poles, which define pole gaps between them, wherein pockets are embodied in the laminated core of the rotor, which in each case run between two pole gaps of the rotor adjacent to them. Arranged in these pockets are permanent magnets, which are essentially radially magnetized and each of which has two ends on the pole gap side, which face towards the pole gaps of the rotor adjacent to it.

SUMMARY OF THE INVENTION

It is the object of the invention to create an electric drive motor, in particular a brushless DC motor, whose permanent magnet rotor is improved, in particular runs with improved smoothness.

The task of the invention is solved by an electric drive motor, having a stator with pole shoes and at least one electrically controllable stator winding, and a permanent magnet rotor mounted in the field of the stator winding in a rotatably drivable manner leaving an annular gap, which has a motor shaft and a laminated core arranged on the motor shaft, which has at least a number of permanent magnets corresponding to the number of poles of the permanent magnet rotor, wherein the permanent magnets inserted in the laminated core are coated with a plastic envelope, and wherein the plastic envelope has at least one side wall covering the laminated core on at least one of its two axial front sides, which has at least one recess, which frees areas of the axial front side covered by the side wall of the plastic envelope, as an access opening for boring of the laminated core within the framework of a balancing of the permanent magnet rotor.

The electric drive motor can in particular have a fixed outer stator and a rotatably mounted internal rotor. The permanent magnet rotor has a multiplicity of poles, in particular four, six, eight or more poles. A pocket in the laminated core can be assigned to each permanent magnet of the permanent magnet rotor. In each case a single permanent magnet can be inserted in one of these pockets and fixed therein in particular against slippage. All permanent magnets of the permanent magnet rotor can generally be embodied in identical form. Each permanent magnet can have a rectangular form. The two opposite largest delimiting surfaces of the permanent magnet can here be oriented in a peripheral direction, wherein lateral smaller delimiting surfaces form the poles of the magnets. The permanent magnets can be arranged uniformly distributed over the circumference of the permanent magnet rotor.

Each pocket can have a shape corresponding to the form of the permanent magnets, wherein the pocket is embodied to be slightly larger, so that in each case a single permanent magnet can be inserted into a pocket.

The laminated core of the permanent magnet rotor is formed by a multiplicity of, in particular punched laminate sheets, which are stacked congruently on top of each other and are connected to each other in a compact package. The laminated core can to this extent be produced by means of punch-packaging. The laminations stacked congruently on top of each other can be connected by fasteners, for example by means of welding, riveting, clamping or punch- or adhesion-packaging. During punch-packaging, rib-shaped or gill-shaped projections and indents are formed in the single laminations by means of the reshaping of individual areas of all single laminations, wherein the projections of a single lamination in each case penetrate into the corresponding indents of a directly adjacent single lamination and in such a way a form-fitted and/or frictionally engaged connection of all single laminations to the complete laminated cores comes about.

The permanent magnets can for example have a large-area frontal delimiting surface, essentially rectangular in a peripheral direction and pointing in the direction of rotation and an oppositely located, similarly sized rear delimiting surface essentially rectangular in a peripheral direction and pointing counter to the direction of rotation. An inner narrow delimiting surface can point towards the robot shaft and an oppositely located outer narrow delimiting surface can form a magnetic pole of the rotor. All edges of the rectangular permanent magnet can be provided with a chamfer or be embodied in rounded-off form.

As the plastic envelope has at least one side wall covering the laminated core on at least one of its two axial front sides, which has at least one recess, which frees areas of the side wall of the axial front side covered by the plastic envelope, as an access opening for boring of the laminated core within the framework of a balancing of the permanent magnet rotor, the permanent magnet rotor can have an improved running smoothness, as the permanent magnet rotor can be balanced more simply, efficiently and/or more precisely. According to the invention, balancing of the permanent magnet rotor takes place by means of a drill being introduced into the correspondingly required recess, and here the tip of the drill can be positioned directly in the area of the axial front side of the laminated core exposed by the recess, in order to remove material from the laminated core by means of boring. Because of the recess, boring of the plastic material of the plastic envelope does not occur. This improves the running of the drill and improves the precision of the positioning for the removal of material from the laminated core, in order to balance the latter very precisely through the removal.

The laminated core is preferably embodied in circular form, wherein in particular both axial front sides of the laminated core are delimited in each case by a side wall of the plastic envelope. This means that both opposite side walls of the plastic envelope can in each case also be provided with one or a multiplicity of recesses. On the other hand the peripheral wall of the laminated core preferably remains free of a plastic envelope. This means that in such an embodiment the peripheral wall of the laminated core directly delimits the annular gap of the drive motor. In this connection removal of material from the laminated core for balancing purposes is also not performed directly on the peripheral wall of the laminated core, but exclusively on the axial front sides of the laminated core. The recesses in the plastic envelope should here preferably lie on a largest possible diameter or radius respectively, so that during balancing as little material as possible has to be removed from the laminated core in order to obtain the same balancing result.

The at least one recess or a multiplicity of recesses can already be created during the injection molding of the plastic envelope. This can for example take place in that the cavity of the injection mold has sliders corresponding to the desired recesses, which form placeholders during the injection molding process, so that the spaces which are to form the recesses are occupied by the sliders and are thus not filled with plastic material for the plastic envelope during the injection molding. Alternatively in a variant which although not preferred is equally possible, the one or multiplicity of recesses could if appropriate also be excavated from the plastic material of the plastic envelope after an injection molding of the plastic envelope.

The at least one recess can be formed from a plain cylindrical through-opening which extends in an axial direction from an outer front side of the side wall of the plastic envelope to the axial front side of the laminated core.

The circular cylindrical through-opening can here have a diameter which is only slightly larger than the diameter of the drill which removes material from the laminated core for balancing purposes.

The at least one recess can be formed from a conical through-opening which extends in an axial direction starting from an outer front side of the side wall of the plastic envelope to the axial front side of the laminated core, with its diameter reducing in size.

The conical form of the through-opening here enables a pre-centering of the drill for removal of material from the laminated core during the balancing, so that the precise location at which the drill should commence removal can be maintained with particular precision.

The side wall of the plastic envelope can have a multiplicity of recesses arranged distributed in a peripheral direction. The multiplicity of recesses arranged distributed in a peripheral direction can in particular lie on a greater diameter than the centers of the permanent magnet.

To this extent the recesses always lie outside the areas in which the permanent magnets lie, as the permanent magnets are preferably not to be drilled into, but rather the laminated core bearing the permanent magnets. The recesses are also preferably provided separately to other openings in the plastic envelope, which for example are present when fixing rods of an injection mold which are embodied to retain the laminated core in a predetermined position within the cavity of the injection mold during a coating with plastic, necessitate such openings. However these other openings hold the rotor in the cavity on the permanent magnets and not directly on the laminated core.

In a peripheral direction the side wall of the plastic envelope can have two recesses distanced from each other in a peripheral direction in each case in each sector of the side wall of the plastic envelope arranged between two permanent magnets.

As the inventive recesses should preferably free areas of the laminated core, the recesses are arranged in sectors which differ from the sectors in which the permanent magnets are arranged.

The laminated core can have a multiplicity of single laminations stacked on top of each other, which are connected by fasteners into an overall stack forming the laminated core, wherein the fasteners are arranged in a peripheral direction in each case in one of the sectors embodied between two permanent magnets in such a way that the recesses in the side wall of the plastic envelope are arranged offset relative to the fasteners in a peripheral direction and/or radial direction.

As the inventive recesses should preferably free areas of the laminated cores which are to be drilled into for balancing purposes, the recesses are arranged offset in a peripheral direction and/or radial direction to the peripheral directions and/or radial directions in which the fasteners are arranged. It is thereby prevented that the fasteners could be drilled into during the balancing, which would destroy the fasteners and damage the laminated core.

The recesses in the side wall can be provided with peripheral wall sections on a peripheral edge of the plastic envelope, through which the recesses are embodied as notches closed at the edge of the plastic envelope.

As the recesses in the side wall are provided with peripheral wall sections on a peripheral edge of the plastic envelope, through which the recesses are embodied as notches closed at the edge of the plastic envelope, a closed-surface peripheral wall of the permanent magnet rotor is created. This is advantageous as regards the annular gap of the drive motor, in particular in relation to airflow effects. Turbulent streams of air can thus be lessened or reduced by means of the closed-surface peripheral wall of the permanent magnet rotor, which can improve the efficiency of the drive motor.

In a peripheral direction the side wall of the plastic envelope can in each case have an indentation in each sector of the side wall of the plastic envelope arranged between two permanent magnets.

Here, the indentation can in each case be present between two adjacent permanent magnets. The indentations can improve the production of the plastic envelope, save plastic material and/or reduce the weight of the permanent magnet rotor, which in turn can improve the efficiency of the drive motor.

One of the indentations in each case can be connected in an airflow engineering sense to the recesses in each case by means of a connecting channel in the side wall of the plastic envelope. The respective connecting channels can in particular be formed in that compared with a smooth-walled embodiment of the side wall of the plastic envelope, unnecessary accumulations of the injection molding material for the plastic envelope are reduced. This can have further advantages, in that for example as a result of the then more uniform material thickness of the side wall of the plastic envelope, lower internal material stresses occur, which could in particular arise during cooling of the hot injection molding material for the plastic envelope. As a result of the smaller amount of injection molding material required, the duration of cooling after the injection molding of the plastic envelope can be reduced, so that cycle times for a multiplicity of injection molding processes can be shortened, and faster production becomes possible. Ultimately, overall injection molding material can be saved, which can make production of the permanent magnet rotors more cost-effective.

The recesses can be provided with peripheral wall sections in the side wall on a peripheral edge of the plastic envelope, through which the recesses are embodied as notches closed at the edge of the plastic envelope, wherein the peripheral wall sections are arranged on the edges of the recesses opposite the connecting channels.

The indentations, which in each case are arranged in each sector of the side wall of the plastic envelope between two permanent magnets, can be arranged over a smaller diameter in the side wall of the plastic envelope than the recesses, which are likewise arranged in a peripheral direction in each case in the sectors of the side wall of the plastic envelope arranged in each case between two permanent magnets.

The laminated core can have a hub with a spline profile, which is embodied to fix the laminated core co-rotationally on the motor shaft, in interaction with a smooth-walled motor shaft. As the laminated core has a spline profile, only the front sides of the spline projections oriented radially inwards engage on the outer, smooth-walled peripheral wall of the motor shaft. The laminated core can in particular be fixed on the motor shaft by means of a press fit. As the laminated core does not sit on the motor shaft over its full surface, but only on the outer, smooth-walled peripheral wall of the motor shaft with the radially inwardly oriented front sides of the spline projections, during the press-mating of laminated core and motor shaft, the laminated core can deform efficiently, that is to say more easily, and only lower internal stresses then arise in the laminated core.

Furthermore however, that is to say alternatively or additionally, the injection mold for producing the plastic envelope can have a spline shaft profile corresponding to the spline profile of the laminated core within the cavity, so that the laminated core, which has a hub with a spline profile, can for the purposes of the injection molding of the coating with the plastic envelope, be mounted precisely positioned within the cavity of the injection mold, in particular with respect to the rotational position of the laminated core in relation to the cavity, specifically in that the laminated core is fitted on the spline shaft profile of the cavity by means of the spline profile.

The task is also solved by a household appliance, in particular a dishwasher, a washing machine, a drier or a cooker hood, having an electric drive motor according to one or a multiplicity of embodiments described and/or represented.

The task is also solved by an injection mold for producing a permanent magnet rotor of an electric drive motor coated with a plastic envelope according to one or a multiplicity of embodiments described and/or represented, wherein the injection mold has axially movable centering pins, which are embodied and arranged to keep the laminated core inserted into the injection mold for molding radially and axially centered in the cavity of the injection mold as a result of the centering pins pressing with their front sides on the areas of the axial front sides of the laminated core, which after the injection molding are exposed by the recesses.

A concrete exemplary embodiment of an inventive electric drive motor is explained in greater detail in the description that follows, with reference to the attached figures. Independently of the concrete connection in which they are mentioned, certain individual features of this exemplary embodiment can, also considered singly or in combinations other than those represented if appropriate, represent general features of the invention.

DESCRIPTION OF THE INVENTION

Figure 1:
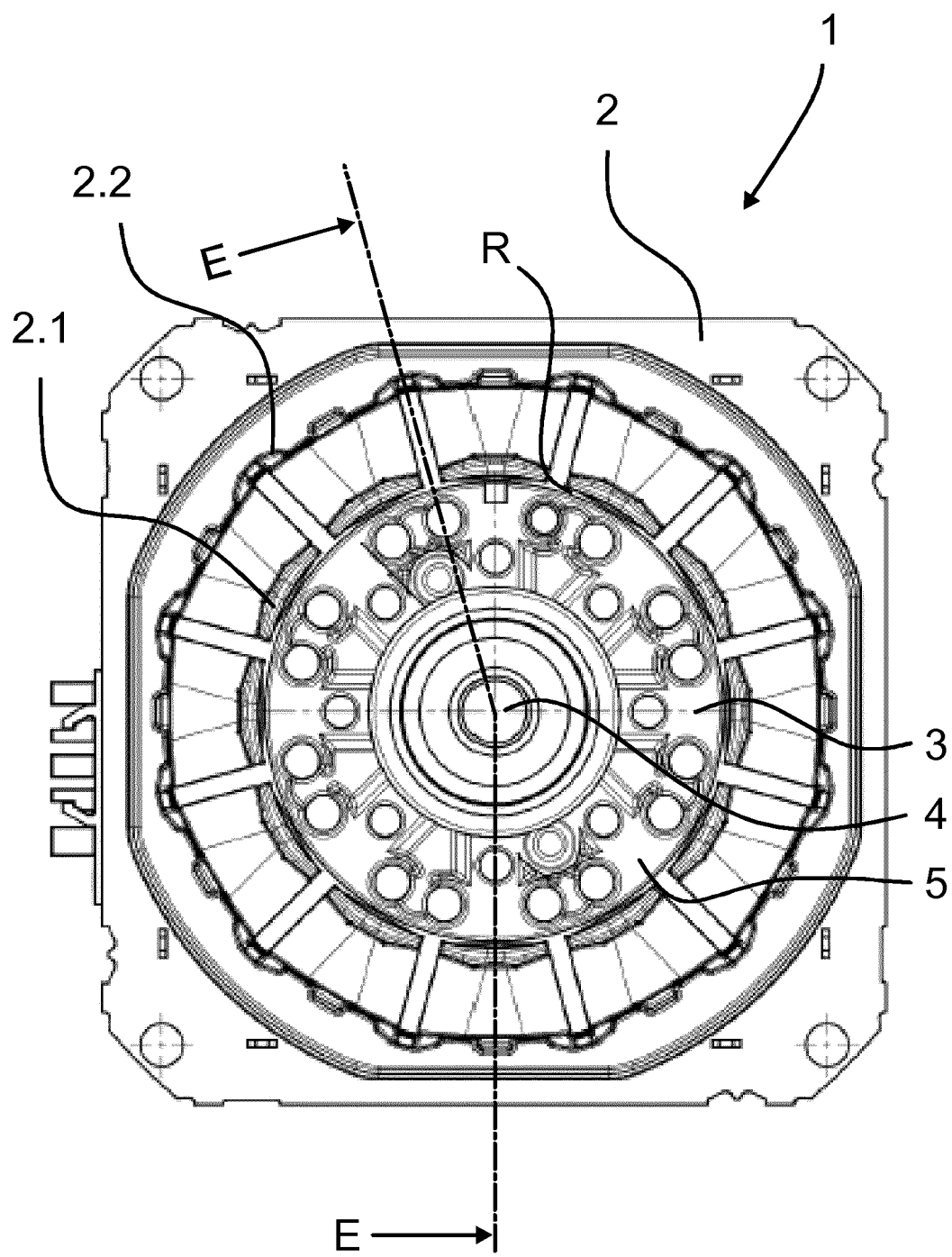
FIG. 1 shows a schematic cutaway representation of an exemplary electric drive motor.

FIG. 1 to FIG. 6 show components of an exemplary electric drive motor 1 of an exemplary washing machine, having a stator 2 with pole shoes 2.1 and at least one electrically controllable stator winding 2.2, and a permanent magnet rotor 3 mounted in the field of the stator winding 2.2 in a rotatably drivable manner leaving an annular gap R, which has a motor shaft 4 and a laminated core 5 arranged on the motor shaft 4, which has at least a number of pockets 6 (FIG. 5) corresponding to the number of poles of the permanent magnet rotor 3, in which in each case one of the permanent magnets 7 (FIG. 2) is inserted.

In the case of the present exemplary embodiment the electric drive motor 1 has a fixed outer stator and a rotatably mounted internal rotor. The permanent magnet rotor 3 has a multiplicity of poles, in particular eight poles. A pocket 6 (FIG. 5) in the laminated core 5 is assigned to each permanent magnet 7 of the permanent magnet rotor 3. A single permanent magnet 7 is in each case inserted into one of these pockets 6 and fixed therein in particular against slippage. Generally, all permanent magnets 7 of the permanent magnet rotor 3 are embodied in identical form. As shown, each permanent magnet 7 can have a rectangular form. Both opposite largest delimiting surfaces of the permanent magnet 7 can be oriented in a peripheral direction, as shown in particular in FIG. 2 and FIG. 6, wherein delimiting surfaces of the permanent magnet 7 on the outer circumference form the poles of the permanent magnet rotor 3. The permanent magnets 7 are arranged uniformly distributed over the circumference of the permanent magnet rotor 3.

Each pocket 6 can have a form corresponding to the form of the permanent magnet 7, wherein the pocket 6 is embodied to be slightly larger, so that in each case a single permanent magnet 7 can be inserted in a pocket 6. The laminated core 5 of the permanent magnet rotor 3 is formed by a multiplicity of, in particular punched laminate sheets, which are stacked congruently on top of each other and are connected to each other in a compact package. The laminated core 5 can to this extent be produced by means of punch-packaging. The laminations congruently stacked on top of each other can be connected by fasteners 8 (see FIG. 5), such as for example by means of welding, riveting, clamping or simply punch- or adhesive-packaging.

The permanent magnets 7 can for example have a large-area frontal delimiting surface, essentially rectangular in a peripheral direction and pointing in the direction of rotation and an opposite similarly-sized rear delimiting surface, essentially rectangular in a peripheral direction and pointing counter to the direction of rotation. An inner narrow delimiting surface can point towards the rotor shaft 4 and an opposite outer narrow delimiting surface can form a magnetic pole of the rotor. All edges of the rectangular permanent magnet 7 can be provided with a chamfer or embodied in rounded-off form.

The inventive electric drive motor accordingly has a stator 2 with pole shoes 2.1 and at least one electrically controllable stator winding 2.2, and permanent magnet rotor 3 mounted in the field of the stator winding 2.2 in a rotatably drivable manner leaving an annular gap R, which has a motor shaft 4 and a laminated core 5 arranged on the motor shaft 4, which has at least a number of permanent magnets 7 corresponding to the number of poles of the permanent magnet rotor 3.

The permanent magnets 7 inserted in the laminated core 5 are coated with a plastic envelope 9, wherein according to the invention the plastic envelope 9 has at least one side wall 10.1, 10.2 covering the laminated core 5 on at least one of its two axial front sides 5.1, 5.2, which has recesses 11, which free areas of the axial front side 5.1, 5.2 covered by the side wall 10.1, 10.2 of the plastic envelope 9, as access openings for boring of the laminated core 5 within the framework of a balancing of the permanent magnet rotor 3.

In the case of the present exemplary embodiment the laminated core is preferably embodied in circular form, wherein in particular both axial front sides 5.1, 5.2 of the laminated core are delimited in each case by a side wall 10.1, 10.2 of the plastic envelope 9. This means that both opposite side walls 10.1, 10.2 of the plastic envelope 9 are also in each case provided with a multiplicity of recesses 11. On the other hand the peripheral wall of the laminated core 5 preferably remains free from a plastic envelope 9. This means that in such an embodiment the peripheral wall of the laminated core 5 directly delimits the annular gap R of the drive motor 1. In this connection a removal of material from the laminated core 5 for balancing purposes is also not performed directly on the peripheral wall of the laminated core 5, but exclusively on the axial front sides 5.1, 5.2 of the laminated core 5. The recesses 11 of the plastic envelope 9 should here preferably lie on a largest possible diameter or radius, so that during balancing as little material as possible has to be removed from the laminated core 5, in order to obtain the same balancing result.

Figure 3:
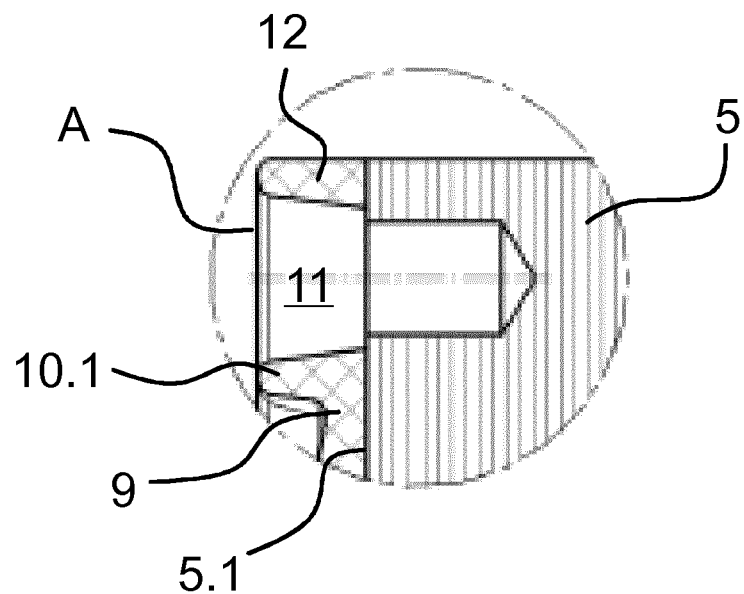
FIG. 3 shows an enlarged partial cutaway representation of a plastic envelope of the permanent magnet rotor according to FIG. 2 in the area of an inventive recess.

As is clearly emphasized in particular in FIG. 3, the at least one recess 11 can be formed by a conical through-opening, which extends in an axial direction starting from an outer front side A of the side wall 10.1, 10.2 of the plastic envelope 9 to the axial front side 5.1, 5.2 of the laminated core 5, with its diameter reducing in size.

In an alternative embodiment, which is not represented here, the at least one recess 11 can be formed from a plain cylindrical through-opening, which extends in an axial direction from the outer front side A of the side wall 10.1, 10.2 of the plastic envelope 9 to the axial front side 5.1, 5.2 of the laminated core 5.

Figure 4:
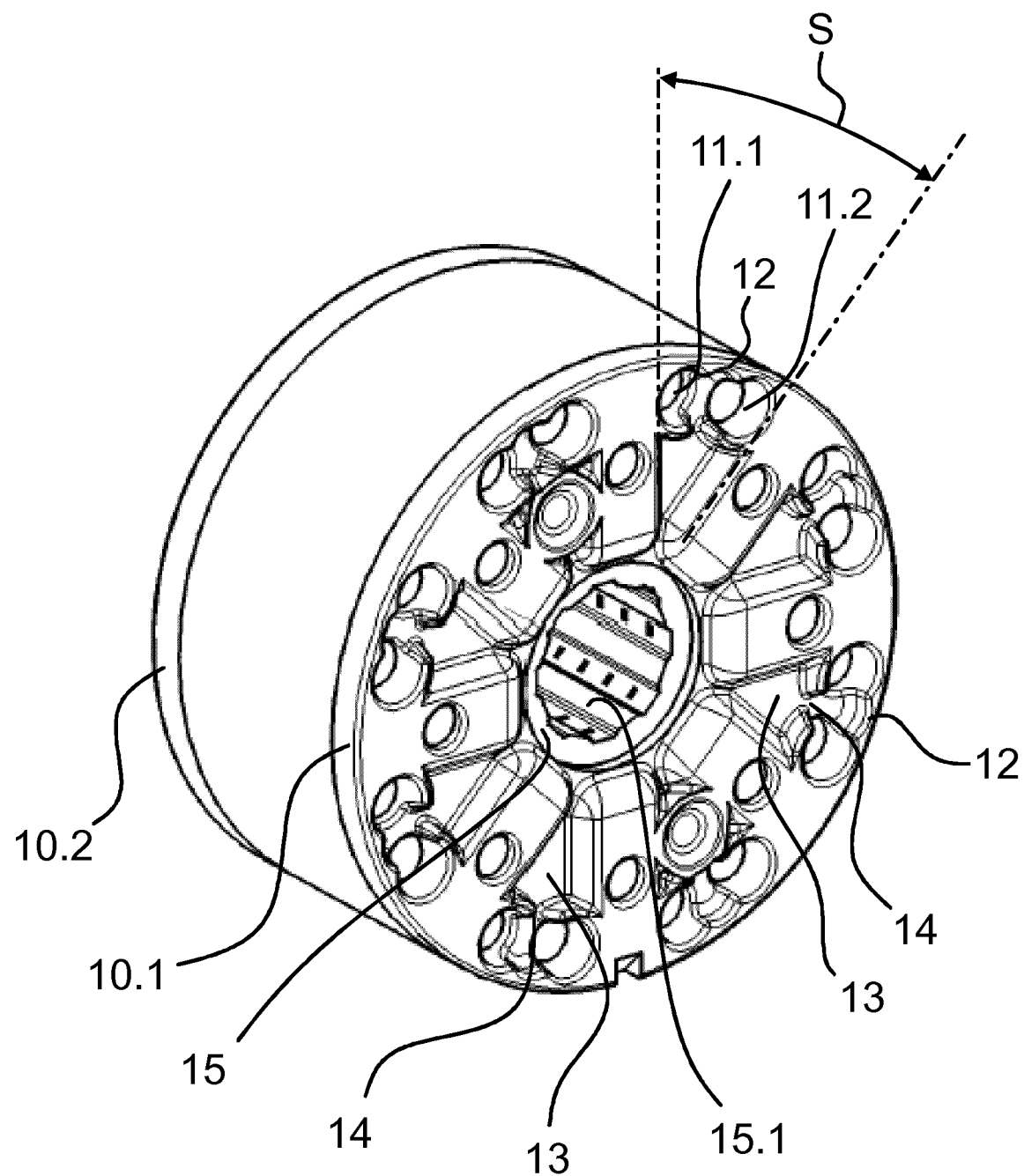
FIG. 4 shows a perspective representation of the permanent magnet rotor according to FIG. 2 and FIG. 3 with the laminated core and of the plastic envelope in isolation.

As represented in particular in FIG. 4, the side wall 10.1, 10.2 of the plastic envelope 9 has in a peripheral direction in each sector S of the side wall 10.1, 10.2 of the plastic envelope 9 arranged between two permanent magnets 7 in each case two recesses 11.1 and 11.2, distanced from each other in a peripheral direction.

Figure 2:
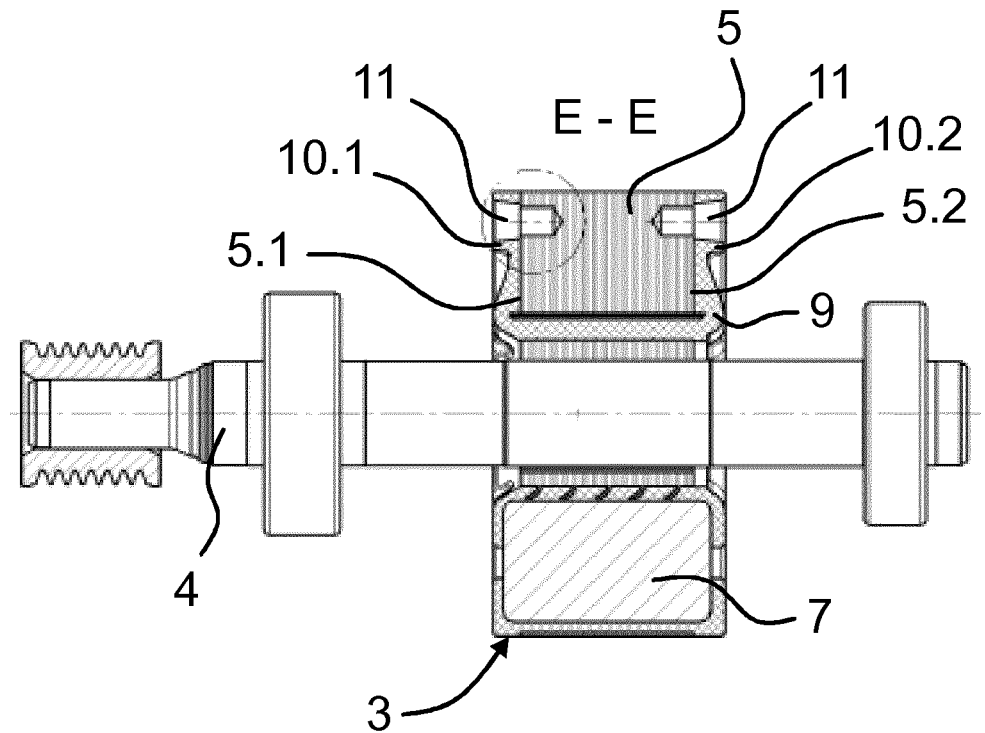
FIG. 2 shows a cutaway representation of a motor shaft and an inventive permanent magnet rotor, which is fixed on the motor shaft.
Figure 5:
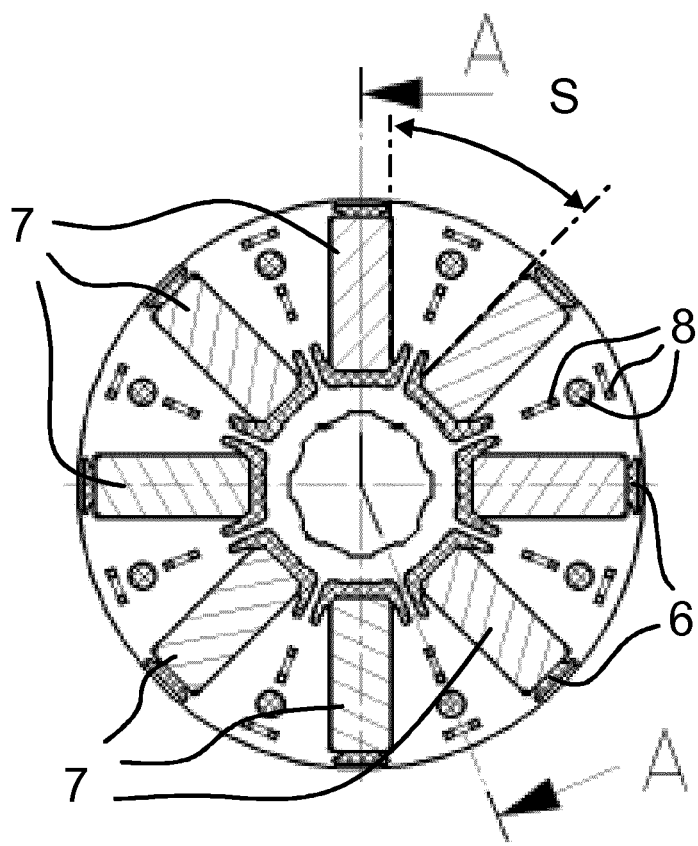
FIG. 5 shows an axial cutaway representation of the laminated core with permanent magnets in place.
Figure 6:
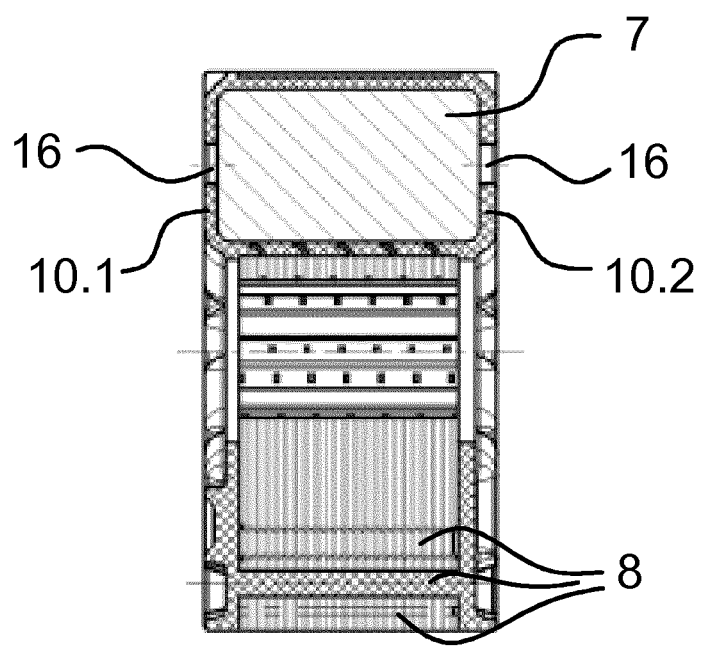
FIG. 6 shows a cross-sectional view of the laminated core with permanent magnets coated with the plastic envelope.

FIG. 2 and FIG. 3 show in particular that the laminated core 5 has a multiplicity of single laminations stacked on top of each other, which are connected by means of the fasteners 8, as can be seen in FIG. 5, into an overall stack forming the laminated core 5, wherein the fasteners 8 in a peripheral direction in each case in the sector S embodied between two permanent magnets 7 are arranged in such a way that the recesses 11, 11.1, 11.2 in the side wall 10.1, 10.2 of the plastic envelope 9 are arranged offset in a peripheral direction relative to the fasteners 8.

In the case of the present exemplary embodiment the side wall 10.1, 10.2 of the plastic envelope 9 has a multiplicity of recesses 11, 11.1, 11.2, arranged distributed in a peripheral direction. The multiplicity of recesses 11, 11.1, 11.2 arranged distributed in a peripheral direction lie in particular on a greater diameter than the centers of the permanent magnet 7.

To this extent the recesses 11, 11.1, 11.2 always lie outside the areas in which the permanent magnets 7 lie, as the permanent magnets 7 should preferably not be drilled, but rather the laminated core 5 bearing the permanent magnets 7. The recesses 11, 11.1, 11.2 are also preferably provided separately from other openings 16 in the plastic envelope 9, which for example are present if fixing rods of an injection mold, which are embodied to retain the laminated core 5 in a predetermined position within the cavity of the injection mold during a coating with plastic, necessitate such openings 16. However these other openings 16 hold the rotor in the cavity on the permanent magnets 7 and not directly on the laminated core 5.

The recesses 11, 11.1, 11.2 are provided in the side wall 10.1, 10.2 with peripheral wall sections 12 (FIG. 4) on a peripheral edge of the plastic envelope 9, through which the recesses 11, 11.1, 11.2 are embodied as notches closed at the edge of the plastic envelope 9.

In the case of the exemplary embodiment represented, the respective side wall 10.1, 10.2 of the plastic envelope 9 is provided in a peripheral direction in each case with an indentation 13 in each sector S of the respective side wall 10.1, 10.2 of the plastic envelope 9 arranged between two permanent magnets 7, as can be seen in particular in FIG. 4.

In the case of the exemplary embodiment represented, one of the indentations 13 is in each case connected to the recesses 11, 11.1, 11.2 in an airflow engineering sense in each case by means of a connecting channel 14 in the respective side wall 10.1, 10.2 of the plastic envelope 9.

The recesses 11, 11.1, 11.2 in the side wall 10.1, 10.2 are provided with peripheral wall sections 12 at a peripheral edge of the plastic envelope 9, through which the recesses 11, 11.1, 11.2 are embodied as notches closed at the edge of the plastic envelope 9, wherein in this case the peripheral wall sections 12 are arranged on the edges of the recesses 11, 11.1, 11.2 opposite the connecting channels 14.

The indentations 13, which in each case are arranged in each sector S of the side wall 10.1, 10.2 of the plastic envelope 9 arranged between two permanent magnets 7, are arranged on a smaller diameter in the side wall 10.1, 10.2 of the plastic envelope 9 than the recesses 11, 11.1, 11.2, which are likewise arranged in a peripheral direction in each case in the sectors S of the side wall 10.1, 10.2 of the plastic envelope 9 arranged in each case between two permanent magnets 7.

As can be seen in particular in FIG. 4 the laminated core 5 has a hub 15 with a spline profile 15.1, which is embodied to fix the laminated core 5 co-rotationally on the motor shaft 4 in interaction with a smooth-walled motor shaft 4.

LIST OF REFERENCE CHARACTERS

1 Electric drive motor
2 Stator
2.1 Pole shoe
2.2 Stator winding
3 Permanent magnet rotor
4 Motor shaft
5 Laminated core
5.1 First axial front side
5.2 Second axial front side
6 Pockets
7 Permanent magnets
8 Fastener 9 Plastic envelope
10.1, 10.2 Side wall
11 Recess
12 Peripheral wall sections
13 Indentation
14 Connecting channel
15 Hub
15.1 Spline profile
16 Openings
A Outer front side
R Annular gap
S Sector

The invention claimed is:

1. An electric drive motor, comprising:
a stator having pole shoes and at least one electrically controllable stator winding producing a field;
a permanent magnet rotor having a number of poles, said permanent magnet rotor being mounted in the field of said stator winding in a rotatably drivable manner and leaving an annular gap;
a motor shaft;
a laminated core disposed on said motor shaft, said laminated core having at least a number of permanent magnets inserted in said laminated core corresponding to said number of poles of said permanent magnet rotor, and said laminated core having two axial front sides; and
a plastic envelope coating said permanent magnets inserted in said laminated core, said plastic envelope having at least one side wall covering said laminated core on at least one of said two axial front sides, said at least one side wall having at least one recess freeing areas of said at least one axial front side covered by said side wall of said plastic envelope as an access opening for boring said laminated core to balance said permanent magnet rotor;
said at least one recess being formed of a conical through-opening extending in an axial direction starting from an outer front side of said side wall of said plastic envelope to said axial front side of said laminated core and having a diameter reducing in size.

2. The electric drive motor according to claim 1, wherein said at least one recess is formed of a plain cylindrical through-opening extending in an axial direction from an outer front side of said side wall of said plastic envelope to said axial front side of said laminated core.

3. The electric drive motor according to claim 1, wherein said at least one recess is a multiplicity of recesses formed in said side wall of said plastic envelope and distributed in a peripheral direction.

4. The electric drive motor according to claim 3, wherein said recesses lie on a greater diameter than centers of said permanent magnets.

5. The electric drive motor according to claim 1, wherein said side wall of said plastic envelope has sectors each being disposed between a respective two of said permanent magnets, and said at least one recess includes two recesses spaced apart from each other in each side wall of said plastic envelope in a peripheral direction in each of said sectors.

6. The electric drive motor according to claim 5, wherein:
said laminated core has a multiplicity of individual laminations stacked on top of each other;
fasteners interconnect said individual laminations into an overall stack forming said laminated core; and
said fasteners are each disposed in a peripheral direction in a respective one of said sectors disposed between two respective permanent magnets causing said recesses in said side wall of said plastic envelope to be offset relative to said fasteners in at least one of a peripheral or a radial direction.

7. The electric drive motor according to claim 1, wherein said plastic envelope has a peripheral edge with peripheral wall sections, and said at least one recess in said side wall includes recesses provided on said peripheral edge forming said recesses into notches closed at said peripheral edge of said plastic envelope.

8. An electric drive motor, comprising:
a stator having pole shoes and at least one electrically controllable stator winding producing a field;
a permanent magnet rotor having a number of poles, said permanent magnet rotor being mounted in the field of said stator winding in a rotatably drivable manner and leaving an annular gap;
a motor shaft;
a laminated core disposed on said motor shaft, said laminated core having at least a number of permanent magnets inserted in said laminated core corresponding to said number of poles of said permanent magnet rotor, and said laminated core having two axial front sides;
a plastic envelope coating said permanent magnets inserted in said laminated core, said plastic envelope having at least one side wall covering said laminated core on at least one of said two axial front sides, said at least one side wall having at least one recess freeing areas of said at least one axial front side covered by said side wall of said plastic envelope as an access opening for boring said laminated core to balance said permanent magnet rotor;
said side wall of said plastic envelope having sectors each being disposed between a respective two of said permanent magnets, and said side wall of said plastic envelope having a respective indentation in a peripheral direction in each of said sectors; and
connecting channels in said side wall of said plastic envelope, each of said indentations being connected to said recesses by a respective one of said connecting channels for conducting an airflow.

9. The electric drive motor according to claim 8, wherein said plastic envelope has a peripheral edge, said recesses in said side wall are provided with peripheral wall sections on said peripheral edge of said plastic envelope, causing said recesses to be formed as notches being closed at said peripheral edge of said plastic envelope, and said peripheral wall sections are disposed on edges of said recesses opposite said connecting channels.

10. An electric drive motor, comprising:
a stator having pole shoes and at least one electrically controllable stator winding producing a field;
a permanent magnet rotor having a number of poles, said permanent magnet rotor being mounted in the field of said stator winding in a rotatably drivable manner and leaving an annular gap;
a motor shaft;
a laminated core disposed on said motor shaft, said laminated core having at least a number of permanent magnets inserted in said laminated core corresponding to said number of poles of said permanent magnet rotor, and said laminated core having two axial front sides;
a plastic envelope coating said permanent magnets inserted in said laminated core, said plastic envelope having at least one side wall covering said laminated core on at least one of said two axial front sides, said at least one side wall having at least one recess freeing areas of said at least one axial front side covered by said side wall of said plastic envelope as an access opening for boring said laminated core to balance said permanent magnet rotor;

said side wall of said plastic envelope having sectors each being disposed between a respective two of said permanent magnets, and said side wall of said plastic envelope having a respective indentation in a peripheral direction in each of said sectors; and said at least one recess in said side wall including recesses disposed in a peripheral direction in each of said sectors, and said indentations being disposed on a smaller diameter in said side wall of said plastic envelope than said recesses.

11. The electric drive motor according to claim 1, wherein said motor shaft has a smooth wall, and said laminated core has a hub with a spline profile for fixing said laminated core co-rotationally on said motor shaft and in interaction with said motor shaft.

12. A household appliance, dishwasher, washing machine, drier or cooker hood, comprising an electric drive motor according to claim 1.

13. An injection mold for producing a permanent magnet rotor of an electric drive motor coated with a plastic envelope according to claim 1, the injection mold comprising:

axially movable centering pins having front sides and being constructed and disposed to keep said laminated core inserted in a cavity of the injection mold for radially and axially centered injection molding in the injection mold as a result of said centering pins pressing with said front sides on areas of said axial front sides of said laminated core and being exposed by said recesses after the injection molding.

\* \* \* \* \*